US006173288B1

(12) United States Patent
Diedrich et al.

(10) Patent No.: US 6,173,288 B1
(45) Date of Patent: *Jan. 9, 2001

(54) SYSTEM AND METHOD FOR BUILDING A DATA STRUCTURE OF CONVERTED VALUES WITHOUT KEYWORDS FROM AN INPUT STRING INCLUDING KEYWORD/TEXT VALUE PAIRS

(75) Inventors: Richard Alan Diedrich, Rochester, MN (US); Scott Thomas Evans, Newark Valley; James Kevan Finkenaur, New Paltz, both of NY (US)

(73) Assignee: International Business Machines Corporation, Armonk, NY (US)

( * ) Notice: Under 35 U.S.C. 154(b), the term of this patent shall be extended for 0 days.

This patent is subject to a terminal disclaimer.

(21) Appl. No.: 09/085,630

(22) Filed: May 27, 1998

Related U.S. Application Data

(62) Division of application No. 08/654,989, filed on May 29, 1996, now Pat. No. 5,787,450.

(51) Int. Cl.⁷ ........................................................ G06F 17/21
(52) U.S. Cl. .............................. 707/102; 707/4; 707/529; 707/530; 707/908
(58) Field of Search .................................. 707/101, 6, 1, 707/513, 3, 4, 102, 530, 908, 529

(56) References Cited

U.S. PATENT DOCUMENTS

| 4,787,035 | 11/1988 | Bourne | 364/300 |
| 4,905,138 | 2/1990 | Bourne | 364/200 |
| 5,337,233 | 8/1994 | Hofert et al. | 264/419.14 |
| 5,365,433 | 11/1994 | Steinberg et al. | 364/419.08 |
| 5,369,577 | 11/1994 | Kadashevich et al. | 364/419.13 |
| 5,414,841 | 5/1995 | Bingham et al. | 395/600 |
| 5,475,588 | 12/1995 | Schabes et al. | 364/419.08 |
| 5,897,633 | * 4/1999 | Nolan | 707/101 |
| 5,983,235 | * 11/1999 | Blackman et al. | 707/101 |
| 5,999,937 | * 12/1999 | Ellard | 707/101 |

OTHER PUBLICATIONS dBase IV The Complete Reference by The LeBlond Group, 1989.*
IBM Technical Disclosure Bulletin, vol. 37, No. 12, Dec. 1994, "Providing Hypertext Links to Code", J. A. Kelly.
IBM Technical Disclosure Bulletin, vol. 38, No. 12, Dec. 1995, "Sequence Reception Method for a Fibre Channel Protocol Chip", G. M. Nordstrom.
IBM Technical Disclosure Bulletin, vol.27, No. 7A, Dec. 1984, Instruction for Text Manipulation (Find Long), J. T. Brady.

* cited by examiner

Primary Examiner—Jean R. Homere
(74) Attorney, Agent, or Firm—Lawrence R. Fraley

(57) ABSTRACT

An application program interface (API) provides an interface for common gateway interface (CGI) programs to parse a CGI input string of keywords and their values, each keyword/value pair being all text data separated by a deliminter character, into a buffer which is formated according to a data definition (DDS) file specification or template, thus building a data structure of converted values without keywords from an input string including keyword and text value pairs.

4 Claims, 2 Drawing Sheets

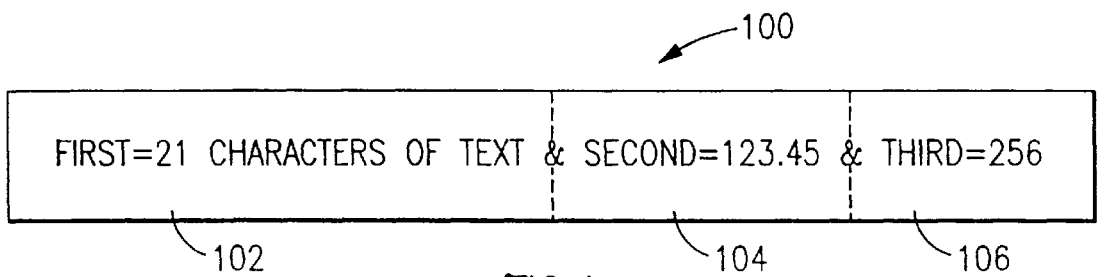
FIG.1
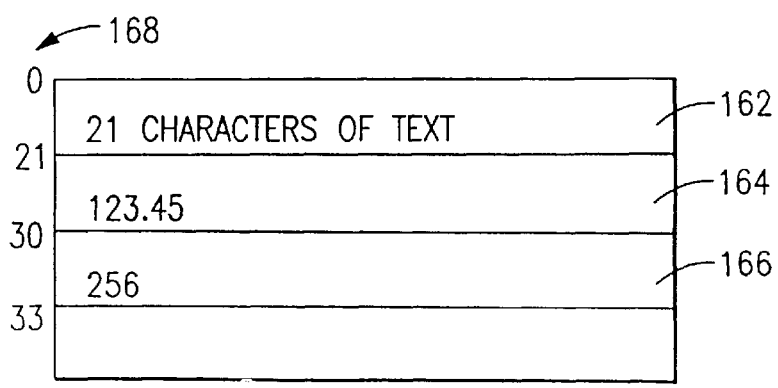
FIG.2
FIG.3

SYSTEM AND METHOD FOR BUILDING A DATA STRUCTURE OF CONVERTED VALUES WITHOUT KEYWORDS FROM AN INPUT STRING INCLUDING KEYWORD/TEXT VALUE PAIRS

CROSS REFERENCE TO RELATED APPLICATION

This patent application is a divisional of U.S. Pat. application Ser. No. 08/654,989, now U.S. Pat. No. 5,787,450, Apparatus and Method for Constructing a Non-Linear Data Object from a Common Gateway Interface.

BACKGROUND OF THE INVENTION

1. Technical Field of the Invention

This invention relates to a computer implemented method and apparatus for creating a data structure. More specifically, to a method and apparatus for creating a data structure comprising a non-linear data object with typed data fields and field names from a common gateway interface type input string.

2. Background Art

When writing a common gateway interface (CGI) program to run under a hypertext markup language (HTML) document server, input data to the CGI program comes in one long text string in the format:

"KeyWordName1=value1&KeyWordName2=value2& . . .

KeyWordNameN=valueN".

This data can be cumbersome to parse into individual values. It is much preferred, for ease of use for many users of computing systems, to present data organized into useful records and fields.

For example, users of IBM AS/400 series machines tend to be most familiar using and viewing data as records and fields in a database. Also, such users are typically familiar with the use of data description specification (DDS) files to organize data into useful records and fields.

It is, therefore, an object of the invention to provide a method for organizing CGI input data, using a DDS file description as the template, into useful records and fields; that is, a data structure comprising a non-linear data object with typed data fields and field names derived from a common gateway interface type input string.

It is a further object of the invention to provide in that non-linear data object data which is converted to the proper data type for each field, such as alphanumeric, integer, or decimal.

SUMMARY OF THE INVENTION

This invention provides an apparatus and method for operating a digital computer to receive an input string including a plurality of text keyword/value pairs; to build from the keyword/value pairs a data structure of converted values without keywords.

In accordance with a further aspect of the invention, a template file listing is provided including for each keyword, the data type and size for the corresponding value; and the data structure is organized to place a converted value within said data structure at an offset determined with reference to the size associated with the keywords in the template file.

In accordance with a further aspect of the invention, a memory element (such as a computer disk or tape, or other non-volatile memory device), or a transmission medium (such as wire or air) or a volatile memory device (such as main memory) is provided to store or transmit signals which are adaptable to operate a computer in accordance with the processes set forth in the previous paragraphs.

Other features and advantages of this invention will become apparent from the following detailed description of the presently preferred embodiment of the invention, taken in conjunction with the accompanying drawings.

BRIEF DESCRIPTION OF THE DRAWINGS

FIG. 1 illustrates the format of a typical input string to a common gateway interface (CGI) program.

FIG. 2 illustrates a data description specification (DDS) file specification, or template file.

FIG. 3 illustrates the contents of the output buffer resulting from executing the method of the invention on the input string of FIG. 1.

BEST MODE FOR CARRYING OUT THE INVENTION

Figure 4:
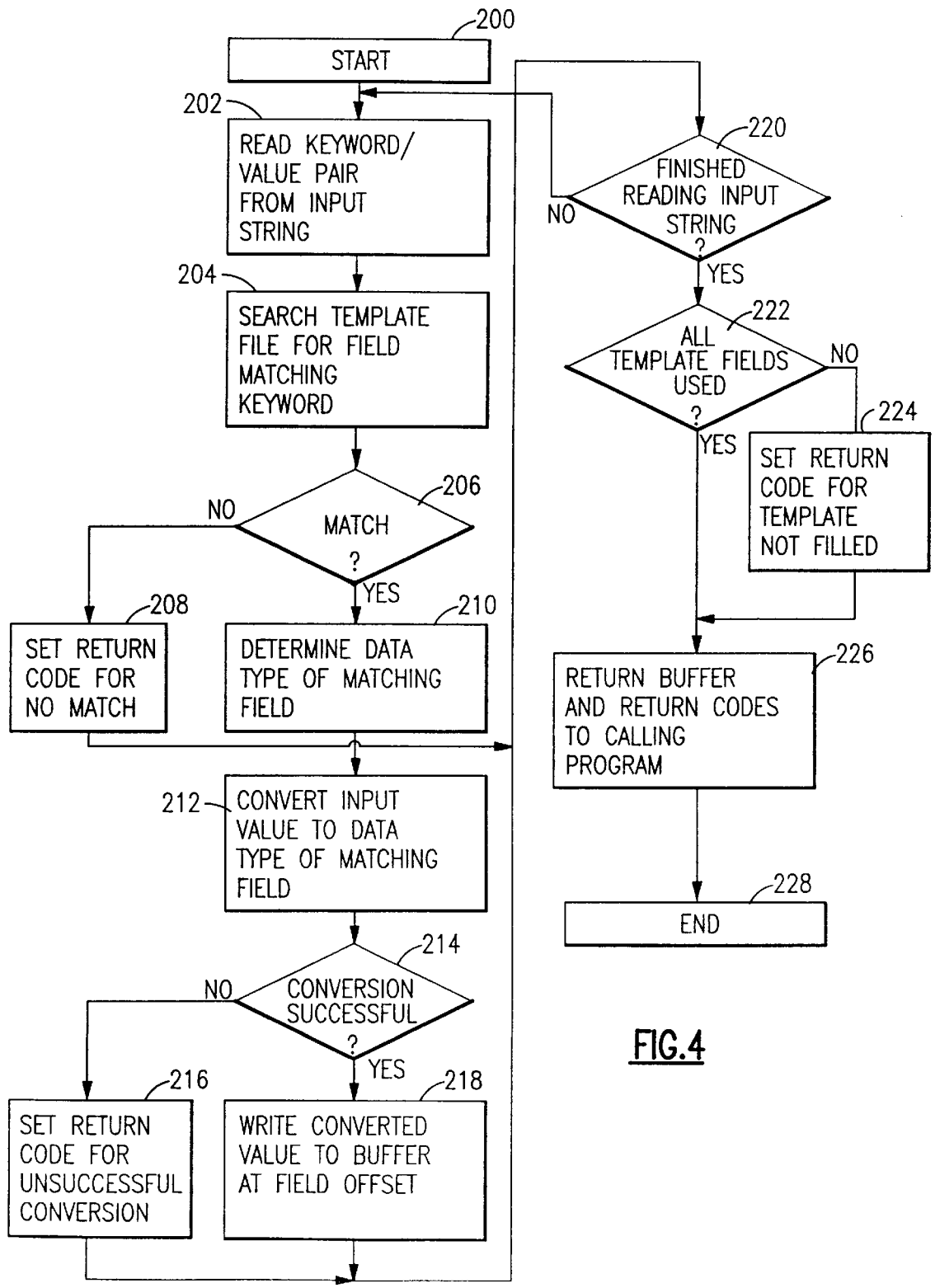
FIG. 4 is a flow diagram of the method of the invention.

Referring to FIGS. 1–3, the application program interface (API) of a preferred embodiment of this invention provides an interface for common gateway interface (CGI) programs to parse CGI input 100, defined as a series of keywords and their values, each keyword/value pair 102, 104, 106 being all text data separated by a delimiter character, in this embodiment "&", into a buffer 160 which is formatted according to a data definition specification (DDS) file specification or template 140.

Table 1 sets forth the API specification QtmhCvtDB, illustrating a preferred embodiment of the invention.

TABLE 1

QTMH_EXTERN void QtmhCvtDb

| (void | *, /* | qualified DDS file name | */ |
|---|---|---|---|
| char | *, /* | buffer containing the string of CGI keyword parameters to be parsed. | */ |
| int | *, /* | length of the string of CGI keyword parameters to be parsed. | */ |
| void | *, /* | output buffer into which the parsed parameter values will be stored. | */ |
| int | *, /* | length of buffer provided for parsed parameter values. | */ |
| int | *, /* | response length. | */ |
| int | *, /* | response code. | */ |
| void | *, /* | error code. | */ |

Referring to FIG. 2, DDS file specification includes, in this example, record name field 142 and a series of field pairs 144, 146 setting forth a template of field names 144 (in this example, field names FIRST, SECOND and THIRD), and corresponding data type and field size definitions 146 (in this example, 21 characters of alphanumeric, 9.3 poision floating point, and 3 position binary or integer, respectively.)

Referring to FIG. 3, the contents of output buffer 160 resulting from execution of the method of the invention shows a plurality of variable length records 162, 164, 166 located at offsets 168 of 1, 21 and 30, respectively, each record containing values converted to proper type from the corresponding text name/value pairs 102, 104, and 106 of the CGI input string.

The advantage to the user, or CGI programmer, is that returned data can be referenced by structure member name, and the data is returned in useable types. Thus, the CGI programmer enters:

CGI_INPUT_STRUCT.FIRST and the returned data is useable, such that 10% of the third parameter is

CGI_INPUT_STRUCT.THIRD*0.1

Referring to FIG. 4, a flow chart of the method of the invention for constructing a typed data structure from a text input string is set forth. In step 200, initialization routines are executed which set up variables, establish working space in memory, read in the DDS template file 140, and receive the passed parameters, including:

| | |
|---|---|
| PtrDbFileName | name of DB template file 140 |
| PtrParseString | the input string |
| StringLength | length of the input string |
| PtrRecBuffer | variable to hold response |
| BufferLength | length of buffer |
| PtrRespLength | length of response |
| PtrRespCode | response code |
| PtrEcStruc | error code structure |

Various local variables are established, the passed pointers and variables are checked for validity, a signal handler is turned on to catch exceptions, null and zero fields are checked, user space to contain the output from the list APIs is created, and a previously created definition of fields from the db_list[] array is found, or a definition of fields is created using the appropriate APIs.

In step 202, a keyword/value pair 102 is read from input string 100. In step 204, template 140 is searched for a match of the keyword word from pair 102 with a keyword 144. If, in step 206, a match is not found in step 208, a bit or field is set in the return codes indicating such, and processing passes to block 220. Otherwise, upon a successful match in block 206, the data type and size for the value in keyword/value pair 102 is determined from entry 146 in template file 140 corresponding to the keyword 144. In step 212, the value in keyword/value pair 102 is converted to the correct data type and size determined in step 210. If the conversion is not successful, such as would be the case if the input value 102 is floating point and the correct data type is day-of-week, for example, then in step 216 a bit or field in the return code is set for unsuccessful conversion, and processing passes to step 220. Otherwise, if conversion is successful, in step 218 the converted value is placed in output buffer 168 at the appropriate offset (in this case, as the first keyword, from pair 102, is also the first keyword in template file 140, then the offset is zero. In this specific embodiment, for subsequent fields 164 and 166, the offset will be related to the sum of field sizes for previous entries in template 140.)

In step 220 it is determined if all keyword/value pairs have been read from input string 100 and, if not, processing passes to step 202 where the next keyword/value pair 104, for example, is read and processed through steps 218. When all keyword/value pairs have been read from input string 100, template 140 is examined to see if all template fields 144 have been used, and if not, in step 224 a bit or field is set in the return code indicating such. Processing then, in either case, passes to step 226 where buffer 168 and the return codes are returned to the calling program, and processing ends.

Table 2 sets forth a source code listing of the main routine implementing the process illustrated in FIG. 2. As will be apparent to those skilled in the art, and therefore not set forth in the source code listing of Table 2, initial routines are provided for declaring and initializing local variables; turning on a SignalHandler to catch exceptions; checking all passed pointers for validity, and that they are not null or zero; handling errors and raising exceptions; assuring that error code structures are valid. Table 2 includes a description, in lines 1825 through 1847, of the process for finding or creating user space to contain output from the list APIs QUSLFLD and QUSLRCD.

TABLE 2

MAIN ROUTINE

```
1825    if (list_header == NULL)
1826        create_list_space( );
1833    db_cvt = find_db_cvt((char*)PtrDbFileName);
1835    reset_fields(db_cvt);
1836    memcpy(parm_data, PtrParseString,
                StringLength);
1837    parm_data[*PtrStringLength] = '\0';
1838    PtrTempReceiver =
                (char*)malloc(RequiredBufferSize);
1839    RequestMethod = getenv ("REQUEST_METHOD");
1842    if (strcmp(requestMethod, "GET") !=0
1843    {
1844        ptr_char = strcat("first?", parm_data);
1845        strcpy(parm_data, ptr_char);
1846    }
1847    strtok(parm_data, "?");
1848    while ((field_name=strtok(NULL, "=")) !=NULL
1849    {
1850        if ((data = strtok(NULL, "&")) !=NULL
1851        {
1852            fill_field(db_cvt,(char*)PtrTempReceiver,
                    cvt_data(field_name),cvt_data(data),
                    &error_flag);
1854        }
1855    }
1856    fill_unused_fields(db_cvt, (char*)
            PtrTempReceiver,&error_flag);
1858    if (BufferLength >= RequiredBufferSize)
            memcpy(PtrRecBuffer, PtrTempReceiver,
                RequiredBufferSize);
1861    *PtrRespLength = RequiredBufferSize;
1862    if (error_flag > 4)
            error_flag &= 3;
1864    *PtrRespCode = -(error_flag);
1865    signal (SIGALL, original_handler);
1866    return;
1867    }
```

Several functions are called in the course of processing the main routine and related routines, among them the following: (1) cvt_to_alpha copies 271 data from source to result and pads with blanks; (2) cvt_to_pd converts data to packed decimal; and (3) cvt_to_f converts data to floating point notation; (4) cvt_to_i converts data to integer. C-code routines for several other functions and structures helpful to an understanding of a preferred embodiment of the invention are set forth in the following tables.

Table 3 describes the create_list_space function, which creates the space to be used by the list APIs QUSLFLD and QUSLRCD.

TABLE 3

CREATE LIST SPACE

```
void create_list_space (void)
{
char attrb[10];
char desc[50];
void *space_ptr;
```

TABLE 3-continued
CREATE LIST SPACE

```
int error_code = 0;
sprintf(list_space_name, "%-10s%", LIST_SPACE,
   LIST_SPACE_LIB);
memset(attrb, ' ', 10);
memset(desc, ' ', 50);
sprintf(attrb, "%-10s", LIST_SPACE_ATTR);
sprintf(desc, "%-50s", LIST_SPACE_DESC);
QUSCRTUS(list_space_name, attrb, LIST_SPACE_SIZE,
   "\0", "*LIBCRTAUT", desc, "*YES         ",
   &error_code);
QUSPTRUS(list_space_name, &space_ptr);
list_header = (header_struct*)space_ptr;
}
```

Table 4 describes the create_db_cvt function, which reads in the DDS template file and creates the db_cvt$_{13}$_t structure; list_header contains the address of user space. A call to the List Record Formats API generates a list of record formats available for the file named in the calling parameter list (db_name). This code assumes there will only be one record format returned (it only looks at the first record format name returned.) The List Fields API is called to generate a list of field names and descriptions from the record format name returned by the QUSLRCD() API.

TABLE 4
CREATE DB CONVERT STRUCTURE

```
DB_CVT_t *create_db_cvt (char *db_name)
{
  Qdb_Lrcd_RCDL0100_t *record_list;
  Qdb_Lfld_FLDL0100_t *field_list;
  DB_CVT_t *db_cvt;
  FIELD_CVT_t *field_cvt;
  int field;
  QUSLRCD(list_space_name, "RCDL0100", db_name,
     "0");
  record_list = (Qdb_Lrcd_RCDL0100 *) ((char*)
              list_header + list_header ->
              8 list_section_offset);
  QUSLFLD(list_space_name, "FLDL0100", db_name,
     record_list->Format_Name, "0");
  field_list = (Qdb_Lfld_FLDL0100 *)
             ((char*)list_header +
             list_header->list_section_offset);
  db_cvt = (DB_CVT_t*)malloc(sizeof(DB_CVT_t) +
          (list_header->number_of_entries - 1) *
          sizeof(FIELD_CVT_t));
  db_cvt->field_count = list_header ->
            number_of_entries;
            memcpy(db_list[db_count].db_name,
            db_name, 20);
  db_list[db_count].db_cvt = db_cvt;
  db_count++;
  field_cvt = db_cvt->field_cvt;
  for (field = 0; field < db_cvt->field_count;
           field++, field_cvt++)
  {
  memcpy(field_cvt->field_name, field_list->
       Field_Name, 10);
  field_cvt->field_offset = field_list->
       Input_Buffer_Position - 1;
  field_cvt->field_type = field_list->Data_Type;
  RequiredBufferSize = field_list->
       Input_Buffer_Position - 1 + field_list->
       Field_Length_Bytes;
  switch (field_cvt->field_type)
     {
        case 'A':
        case 'S':
        case 'T':
        case 'L':
```

TABLE 4-continued
CREATE DB CONVERT STRUCTURE

```
     case 'Z': field_cvt->field_length =
             field_list->Field_Length_Bytes;
          field_cvt->field_dec_pos = 0;
          field_cvt->convert_function =
             cvt_to_alpha;
          break;
     case 'P': field_cvt->field_length =
             field_list->Digits;
          field_cvt->field_dec_pos =
             field_list->Decimal_Positions;
          field_cvt->convert_function =
             cvt_to_pd;
          break;
     case 'F': field_cvt->field_length =
             field_list->Field_Length_Bytes;
          field_cvt->field_dec_pos =
             field_list->Decimal_Positions;
          field_cvt->convert_function =
             cvt_to_f;
          break;
     case 'B': field_cvt->field_length =
             field_list->Field_Length_Bytes;
          field_cvt->field_dec_pos = 0;
          field_cvt->convert_function =
             cvt_to_i;
          break;
     }
  field_list = (Qdb_Lfld_FLDL0100 *) ((char *)
             field_list + list_header ->
             size_of_entry);
  }
  return db_cvt;
}
```

Table 5 describes the find_db_cvt function, which finds an existing db_cvt_t structure, if it exists, containing field definitions that have already been created.

TABLE 5
FIND DB CONVERT

```
DB_CVT_t *find_db_cvt(char *db_name)
{
  int i;
  for (i = 0; i < db_count; i++)
     if (memcmp(db_list[i].db_name,
        db_name, 20) == 0)
        return db_list[i].db_cvt;
  return create_db_cvt(db_name);
}
```

Table 6 describes the reset_fields function.

TABLE 6
RESET FIELDS

```
void reset_fields(DB_CVT_t *db_cvt)
{
  int i;
  FIELD_CVT_t *field_cvt;
  field_cvt = db_cvt->field_cvt;
  for (i = 0; i < db_cvt->field_count; i++,
     field_cvt++) field_cvt->field_used = 0;
}
```

Table 7 describes the fill_unused_fields function, whcih fills all the unused fields with appropriate filler.

TABLE 7

FILL UNUSED FIELDS

```
void fill_unused_fields(DB_CVT_t *db_cvt, char
    *buffer, int *error_field)
{
  int i;
  FIELD_CVT_t *field_cvt;
  int error;
  field_cvt = db_cvt->field_cvt;
  for (i = 0; i < db_cvt->]field_count;
    i++, field_cvt++)
    if (field_cvt->field_used == 0)
    {
      *error_field = *error_field | 1;
      switch (field_cvt->field_type)
      {
        case 'A':
        case 'S':
        case 'T':
        case 'L':
        case 'Z':
          field_cvt->convert_function(buffer +
            field_cvt->field_offset, " ",
            field_cvt->field_length, 0, &error);
          break;
        case 'B':
        case 'P':
        case 'F':
          field_cvt->convert_function(buffer +
            field_cvt->field_offset, "0",
            field_cvt->field_length,
            field_cvt->field_dec_pos, &error);
          break;
      }
    }
}
```

Table 8 describes the cvt_ data fuction, which converts the data passed to upper case, converts plus signs to blanks, and converts escape sequences (identified by % sign) to a single character.

TABLE 8

CONVERT DATA

```
char *cvt_data(char *s)
{
  char *c;
  c = s;
  while ((c = strchr(c, '+')) != NULL)
    *c++ = ' ';
  c = s;
  while ((c = strchr(c, '%')) != NULL)
  {
    *(c + 1) = toupper(*(c + 1));
    *(c + 2) = toupper(*(c + 2));
    cvtch(c, c + 1, 2);
    strcpy(c + 1, c + 3);
    c++;
  }
  return s;
}
```

Table 9 describes the fill-field function, which fills in the buffer with the information for this field and creates padded names.

TABLE 9

FILL FIELD

```
void fill_field(DB_CVT_t *db_cvt, char *buffer, char
    *field_name, char *data, int *error_field)
```

TABLE 9-continued

FILL FIELD

```
{
  FIELD_CVT_t *field_cvt;
  char padded_name[11];
  int error;
  int i = strlen(field_name);
  char *c = padded_name;
  sprintf(padded_name, "%-10s", field_name);
  while (i--)
  {
    *c = toupper(*c);
    c++;
  }
  field_cvt = db_cvt->field_cvt;
  for (i = 0; i < db_cvt->field_count; i++,
    field_cvt++)
    {
      if (memcmp(padded_name, field_cvt->field_name,
        10) == 0)
      {
        switch (field_cvt->field_type)
        {
          case 'A':
          case 'B':
          case 'S':
          case 'T':
          case 'L':
          case 'Z':
          case 'P':
          case 'F': field_cvt->
            convert_function(buffer +
            field_cvt->field_offset,
            data, field_cvt->field_length,
            field_cvt->field_dec_pos,
            &error);
          field_cvt->field_used = 1;
          if (error != 0)
            *error_field = *error_field |
              4;
          return;
        }
      }
      else if (i == (db_cvt->field_count -1))
        *error_field = *error_field | 2;
    }
}
```

ADVANTAGES OVER THE PRIOR ACT

This invention provides a method and programming structure for creating a data structure comprising a non-linear data object with typed data fields and field names from a common gateway interface type input string.

ALTERNATIVE EMBODIMENTS

It will be appreciated that, although specific embodiments of the invention have been described herein for purposes of illustration, various modifications may be made without departing from the spirit and scope of the invention. For example, the digital signals required to operate the computer to perform the method of the invention may be stored in or transmitted through a storage or transmission medium.

Accordingly, the scope of protection of this invention is limited only by the following claims and their equivalents.

We claim:

1. A method for operating a digital computer, comprising the steps of:

receiving an input string including a plurality of pairs of text keywords and text values;

providing in a template file for each text keyword and text value pair the data type and size for converting said text value to the data type corresponding to said text keyword in said pair; and responsive to said template, building from said pairs a data structure of converted values without keywords.

2. The method of claim 1 further comprising the step of organizing said data structure to place a converted value within said data structure at an offset determined with reference to the size associated with said keywords in said template file.

3. A digital computer, comprising;

means for receiving an input string including a plurality of pairs of text keywords and text values;

means for providing in a template file for each text keyword and text value pair the data type and size for converting said text value to the data type corresponding to said text keyword in said pair; and means responsive to said template, for building from said pairs a data structure of converted values without keywords.

4. A memory element for storing digital signals operable to control a digital computer, comprising:

signal means for receiving an input string including a plurality of pairs of text keywords and text values;

signal means for providing in a template file for each text keyword and text value pair the data type and size for converting said text value to the data type corresponding to said text keyword in said pair; and signal means responsive to said template for building from said pairs a data structure of converted values without keywords.

* * * * *